United States Patent [19]
Lavin

[11] Patent Number: 4,749,528
[45] Date of Patent: Jun. 7, 1988

[54] DISTILLATION TRAYS

[75] Inventor: John T. Lavin, London, England

[73] Assignee: The Boc Group, Plc., Windlesham, England

[21] Appl. No.: 941,576

[22] Filed: Dec. 15, 1986

Related U.S. Application Data

[63] Continuation of Ser. No. 749,691, Jun. 28, 1985, abandoned.

[30] Foreign Application Priority Data

Jun. 28, 1984 [GB] United Kingdom ............... 8416497

[51] Int. Cl.⁴ .............................................. B01F 3/04
[52] U.S. Cl. .................. 261/114.1; 202/158; 261/114.3
[58] Field of Search ............... 261/114.1, 114.3, 114.5; 202/158

[56] References Cited

U.S. PATENT DOCUMENTS

| | | | |
|---|---|---|---|
| 2,772,080 | 11/1956 | Huggins et al. | 261/114.3 |
| 2,784,953 | 3/1957 | Ng | 261/114.3 |
| 2,853,281 | 9/1958 | Hibshman et al. | 261/114.3 |
| 2,884,236 | 4/1959 | Maille | 261/114.3 |
| 2,951,691 | 9/1960 | Nutter | 261/114.3 |
| 3,125,614 | 3/1964 | Mayfield et al. | 261/114.3 |
| 3,417,975 | 12/1968 | Williams et al. | 261/114.3 |
| 3,759,498 | 9/1973 | Matsch | 261/114.3 |
| 4,101,610 | 7/1978 | Kirkpatrick et al. | 202/158 X |
| 4,328,177 | 5/1982 | Trager | 261/114.1 |
| 4,547,326 | 10/1985 | Weiler | 261/114.1 |

FOREIGN PATENT DOCUMENTS 765623  1/1957  United Kingdom ........... 261/114.3

Primary Examiner—Richard L. Chiesa
Attorney, Agent, or Firm—Chris P. Konkol; Larry R. Cassett

[57] ABSTRACT

A distillation tray of the sieve type with a chordal weir or outlet has vapor passages therethrough. The density of vapor passages in the main liquid flow area immediately between the liquid inlet and the liquid outlet of the tray is higher than in the remaining area of the tray so that more vapor flow will be directed into the more active main liquid flow area of the tray, whereby the vapor leaving the tray from the main liquid flow area has substantially the same composition as the vapor leaving the tray from the other area.

4 Claims, 2 Drawing Sheets

DISTILLATION TRAYS

This is a continuation of co-pending application Ser. No. 749,691 filled on June 28, 1985, now abandoned.

BACKGROUND OF THE INVENTION

The present invention relates to distillation trays for use in distillation columns.

A conventional distillation column includes a plurality of horizontal distillation trays which are spaced apart vertically. Each tray has a plurality of evenly spaced vapour passages therethrough and is associated with downcomers. Each downcomer has an inlet which receives liquid from a tray above and an outlet from which the liquid discharges onto the adjacent lower tray. When a liquid mixture having two or more components is distilled, liquid descends the column tray by tray and, as it flows across the trays, it comes into intimate contact with vapour rising through the passages. Typically the column is provided with a condenser at its top to provide the downward passage of liquid and a boiler to promote the upward flow of vapour. Thus, as the vapour ascends the column it becomes progressively colder and as the liquid descends the column it becomes progressively warmer. The aforesaid intimate contact between the ascending vapour and the descending liquid causes the vapour to give up to the liquid more and more of the less volatile component or components of the mixture being distilled. Thus, the vapour as it ascends the column becomes progressively richer in the more volatile component or components of the mixture.

As a result, the mixture separates into two fractions of different composition, one liquid and the other vapour.

A conventional distillation tray is circular or part-circular in shape. In use, it may receive liquid along one chord and discharge liquid over an opposite chord. The flow path from liquid inlet to liquid outlet around the periphery of the tray is longer than that defined by a straight line extending perpendicularly from the chordal liquid inlet to the chordal liquid outlet.

The liquid therefore tends to dwell at the periphery of the tray. As a result, a greater degree of contact takes place between the relatively cold liquid and the relatively warm vapour at the periphery of the tray than, say, at its centre. The liquid at the periphery of the tray becomes more depleted in its more volatile component or components than the liquid at the centre. This liquid is then less able to transfer the more volatile component or components to the vapour with which it comes into contact. The composition of the vapour ascending the column through peripheral tray areas therefore progressively diverges from that of the vapour ascending the column through more central areas, the former vapour being richer in the less volatile component or components of the mixture than the latter vapour. The peripheral areas of the trays are therefore less effective in fractionating the mixture than the more central areas, and accordingly more trays are employed in the distillation column than would be needed were the peripheral and central areas to be equally effective.

Various means have been proposed to ameliorate this problem. For example, rather than relying on a hydraulic or liquid gradient to cause flow of liquid across a tray from its inlet to its outlet, U.S. Pat. No. 3,417,975 proposes employing in addition to the conventional uniform pattern of fixed size openings or perforations with walls normal to the tray surface, a uniform pattern of obliquely inclined openings, the latter being oriented in the downstream direction of liquid flow. Such slotted sieve trays, as they have been called, are said to perform with improved efficiency owing to the elimination of longitudinal hydraulic gradient in the liquid on the tray. The neutralisation of the hydraulic gradient is stated to produce uniform resistance to vapour penetration through the liquid on the tray, and both vapour and liquid flows are distributed more evenly over the tray. In order to provide improved uniformity on the tray U.S. Pat. No. 3,759,498 discloses employing bubble promoters near the liquid inlet to the tray with a view to preventing areas of inactivity occuring in the vicinity of the inlet. This has the effect of tending to overburden the tray with liquid in the vicinity of the liquid outlet. U.S. Pat. No. 3,759,498 teaches employing a nonuniform distribution of the oblique slots (though it still employs the conventional uniform distribution of the conventional perforations) with there being a greater slot density in that half of the tray nearer the liquid outlet than in that half nearer the liquid inlet so as to counteract this problem. As a further measure specifically intended to enhance the liquid flow at the periphery of the tray, those slots in the outlet half of the tray towards its periphery are pointed in the direction of the liquid outlet so that the thrust imparted by the vapour to the liquid is in the direction of the outlet and thus the liquid at the periphery of the tray is urged towards the outlet and is prevented from dwelling too long at the periphery. U.S. Pat. No. 3,759,498 further teaches trying to equalise over the whole active surface of the tray the product of the liquid or froth height and the volumetric fraction of liquid in the froth.

We believe that the approach of using oblique slots to improve tray efficiency, as is for example described in the aforementioned U.S. patent specifications, can achieve only partical success.

BRIEF DESCRIPTION OF THE INVENTION

It is an aim of the present invention to provide an alternative approach to improving the efficiency of distillation trays. More particularly, it is an aim of the present invention to provide a distillation tray which adjusts the flow of vapour therethrough so that it more nearly matches the flow of liquid thereover.

According to the present invention, a distillation tray of a kind on which, in use, there are lower liquid flows across some areas, and higher liquid flows across other areas, has vapour passages formed therethrough, an inlet for liquid and an outlet spaced from said inlet, in which the total cross-sectional area of vapour passages varies from area-to-area across the tray so that, in use, the flow of vapour therethrough more closely matches the flow of liquid from the inlet towards the outlet.

We therefore accept that there will be different liquid flow rates in different locations on the tray. Rather than trying to eliminate such differences we employ a smaller total cross-sectional area of vapour passages in regions of the tray where there is a relatively low liquid flow rate than in regions of the tray where there is a higher liquid flow rate. Thus, we prefer, according to the invention, to employ a smaller cross-sectional area of vapour passages in peripheral areas of part-circular trays than in more central areas whereby the longer dwell time of liquid on such areas is compensated for by a reduced amount of liquid-vapour contact per unit time in such areas.

In a preferred embodiment, the distillation tray is of the chordal weir or outlet type with the inlet and outlet diametrically opposed and the area, immediately between the inlet and the outlet having a greater density of passages than the remaining area of the tray.

The invention will now be described, by way of example, reference being made to the Figures of the accompanying diagrammatic drawings, in which:

The drawings are not to scale.

DETAILED DESCRIPTION OF THE INVENTION

Figure 1:
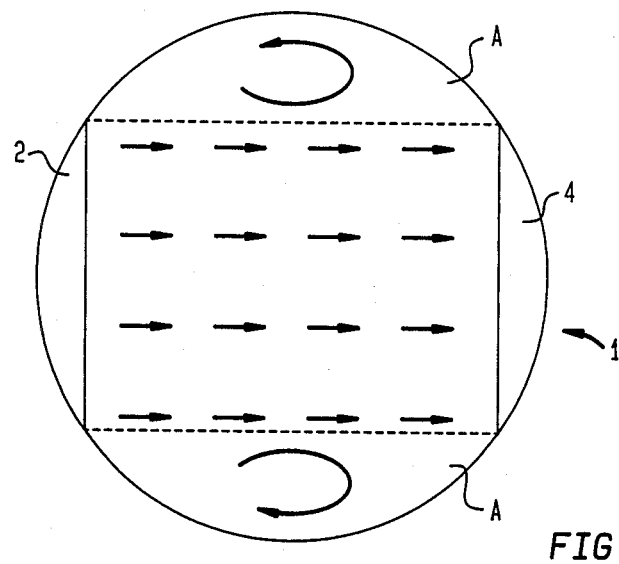
FIG. 1 is a schematic plan view of a known distillation tray of the chordal weir type and FIG. 2 is a schematic plan view of a distillation tray according to the present invention.

As shown in FIG. 1, the distillation tray is a sieve tray 1 of the chordal weir (or outlet) type and has an inlet 2 and diametrically spaced therefrom an outlet 4. If desired a weir may be situated along the chordal outlet. Although not shown, the base of the distillation tray is formed with a plurality of evenly spaced through passages throughout its area. The passages take the form of perforations whose axes extend perpendicularly to the tray surface. It is to be appreciated that the tray will have associated therewith a downcomer at its inlet end and a downcomer at its outlet end.

The arrows indicate the general flow pattern to be expected when liquid enters the tray from the inlet 2 and proceeds across the tray to the outlet 4. The bulk of the liquid behaves reasonably ideally flowing from the inlet to the outlet weir. However, the areas indicated A have relatively low flows in and out and some recirculation may take place. The vapour flow is however generally uniform from area to area on the tray. The areas "A" effectively become stagnant and less efficient. The liquid in the areas "A" contacts a disproportionately high amount of vapour since it stays on the tray 1 longer. There is thus a mismatch between the liquid-vapour ratio associated with the areas A and the liquid/vapour ratio associated with the other areas of the tray.

Figure 2:
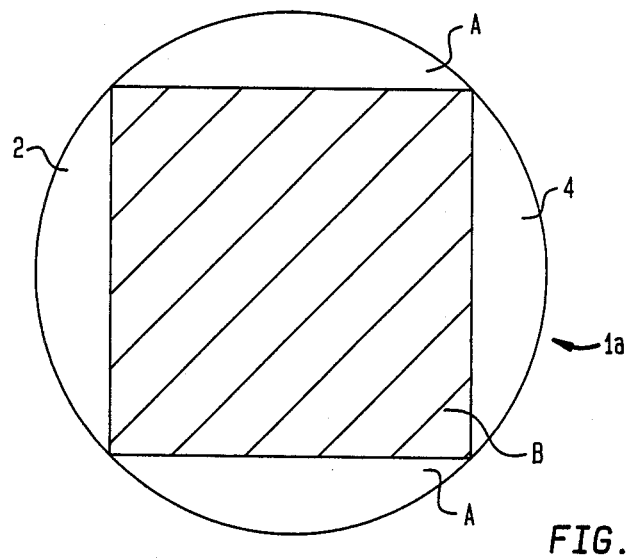

Referring now to FIG. 2, the same parts of the tray 1a have the same reference numerals as tray 1, the areas A have a relatively low density of passages as compared to the area "B" immediately between the inlet 2 and the outlet 4 which has a relatively high density of passages. The passages are of the same kind as are employed in the tray shown in FIG. 1. Thus, the tray 1a has a higher density of perforations in the area of highest liquid flow, which means that more vapour flow will be directed into the main liquid flow area "B" by increasing the perforation density in this area. It has been found that, by aore closely matching the ratio of vapour and liquid flows in areas A with that in area B the better overall tray efficiency results. This matching is achieved by. in effect reducing the flow of vapour through areas A while continuing to allow liquid to dwell in this area. Thus, if the average flow rate of liquid across areas A is Fa, the average flow rate of liquid across area B is Fb, the average flow rate of vapour through areas A is Va and the average flow rate of liquid across area B is Vb, Fb is significantly greater than Fa and Vb is significantly greater than Va but Fa/Va is approximately equal to Fb/Vb.

Although in tray 1a the vapour passages each have the same cross-sectional area and there are more passages per unit area in area B than in area A, the passages in area B could have a larger cross-sectional area than the passages in area A with the number of passages per unit area in areas A and B being the same.

It will be understood that a distillation column will have a plurality of trays 1a arranged spaced apart vertically as is known in the art.

Figure 3:
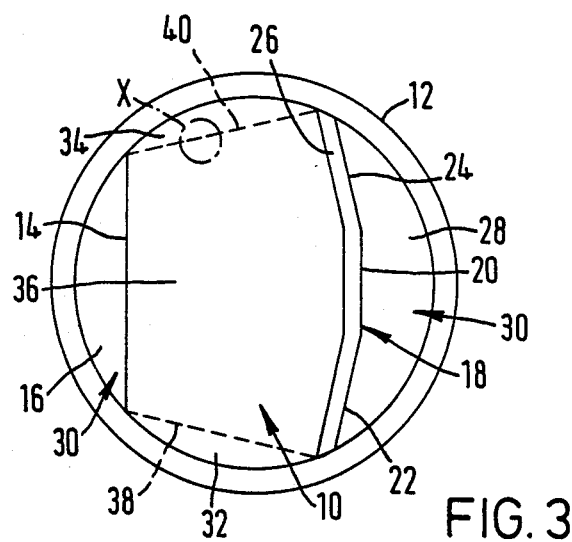
FIG. 3 is a schematic plan view of another distillation tray according to the present invention.

An alternative sieve tray according to the invention is shown in FIG. 3 of the drawings. The tray 10 is supported by means (not shown) within the wall of column 12. The tray 10 is generally circular in shape and is disposed horizontally. The tray 10 has a chordal outlet in the form of a straight edge 14 or alternatively in the form of a weir (not shown). The space 16 defined between the outlet 14 and the wall of column 12 serves as the inlet to a downcomer 30 that in operation conducts liquid from the tray 10 to the next tray below in the column. Opposite the outlet 14 is an inlet 18. The inlet 18 comprises a central part-chordal straight edge 20 that extends parallel to the edge 14 and ends in wings 22 and 24 in the form of straight edges that extend from the edge 20 and which terminate in the curved sides of the tray. The wings 22 and 24 extend from the edge 20 towards the outlet 14 at an angle typically in the range of 10 to 20 degress. The inlet 18 is wider than the outlet 14 and thereby helps to reduce the relative area of the tray on which liquid tends to dwell in use of the tray. The liquid bearing surface of the tray 10 preferably has a narrow imperforate strip or region 26 adjacent and complementary to the inlet 18. The inlet 18 is also associated with a seal pan 28 of a complementary downcomer 30 that is effective to conduct liquid from the outlet of the tray above (not shown in FIG. 3) to the tray 10. The imperforate strip 26 helps to calm the liquid flowing onto the tray 10 from the downcomer 30.

In order to enable the necessary liquid-vapour contact to take place on the surface of the tray 10, the tray 10 has a multiplicity of perforations therethrough. For ease of illustration, the perforations are not shown in FIG. 3. All the perforations have the same dimensions as one another. Each perforation has a vertical axis whereby, in use, the passage of the vapour through the perforations does not impart any horizontal component of velocity to the vapour. The tray 10 thus relies on a hydraulic gradient to enable liquid flow from the inlet 18 to the outlet 14 to take place. The perforations are distributed over the whole liquid-bearing surface area of the tray. 10 save for the imperforate strip 26. The distribution of the perforations is such that over a wide range of liquid loadings the liquid/vapour (flow) ratio associated with peripheral areas of the tray typically matches that associated with the rest of thr tray more closely than the corresponding liquid/vapour ratios are matched in use of the prior art tray shown in FIG. 1. Thus, the density of perforations in the segments 32 and 34 of the tray 10 is less than the density of perforations in the remainder 36 of the perforate liquid bearing surface of the tray 10. The chords that notionally delineate the boundaries between the areas 32, 34 and 36 of the tray 10 are shown as dotted lines in FIG. 3 of the drawings and are indicated by the references 38 and 40. Within each one of the areas 32, 34 and 36 the perforations are uniformly distributed, there typically being the same number of perforations per unit surface area of the tray 10 in the areas 32 and 34 while there is a greater number of perforations per unit surface area of the tray 16 in the area 36.

Figure 4:
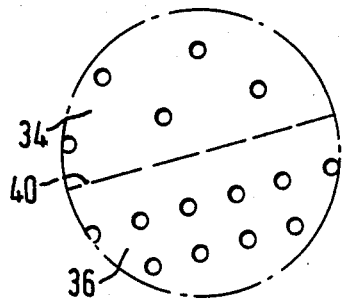
FIG. 4 is an enlarged view of a fragment X of the tray shown in FIG. 3.

FIG. 4 illustrates the relative distribution of perforations in a fragment X (as shown in FIG. 3) of the surface area of the tray 10 that straddles the chord 40.

In use of the tray shown in FIG. 3, a liquid mixture flows from the inlet 18 to the outlet 14 of the tray 10 and comes into intimate contact with vapour passing upwardly through the perforations in the tray. The liquid thus becomes richer in the less volatile component or components of the mixture and the vapour becomes richer in the more volatile component or components of the vapour. The liquid that flows over the relatively less perforate areas 32 and 34 of the tray 10 tends to dwell in comparison with the liquid that flows over the more perforate area 36 of the tray 10. However, there is less liquid-vapour contact on the areas 32 and 34 per unit time than there is on the aore perforate area 36. Over a prolonged period of operation, the average composition of the vapour leaving the surface of liquid overlying the areas 32 and 34 does not deviate greatly from the average composition of the vapour leaving the surface of liquid overlying the area 36. This is because the liquid/vapour ratios over the respective areas also do not deviate much from one another, and such deviations as do occur will be less marked than when the prior art tray shown in FIG. 1 is operated under comparable conditions.

Figure 5:
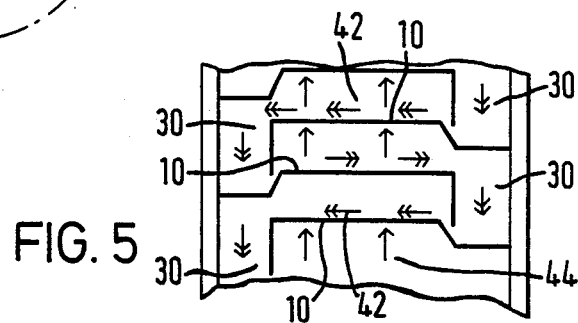
FIG. 5 is a schematic side elevation, partly in section, of a part of a distillation column showing the flow of liquid from tray to tray.

The flow paths of liquid and vapour through a section of the column 12 comprising three trays 10 is shown in FIG. 5. Downcomers 30 effect transfer of liquid from one tray 10 to the next one below. The double-headed arrows 42 indicate liquid flow and the single-headed arrows 44 indicate vapour flow. It will be noted that the direction of the liqud flow on the middle tray (as shown) is opposed to the direction of flow on the other tray. Other flow arrangements are however possible, and the invention is not limited to trays for use in the kind of column shown in FIG. 5. Thus, the invention may be applied to trays for use in columns that employ two sets of complementary trays arranged alongside one another.

In designing a tray, say of the kind shown in FIG. 2, a conventional tray of the kind shown in FIG. 1 may be subjected to a dye test or the like to ascertain the relative flow rates in the peripheral and central areas. Say, it is found that the liquid dwells at the sides of the tray about 5 times longer than it does in the central areas directly between the liquid inlet and outlet. Then, a tray according to FIG. 2 may be provided with the same overall perforated area but with a redistribution of the perforations. The area B in the tray shown in FIG. 2 may thus be provided with a greater number of perforations than the corresponding area of the tray shown in FIG. 1 and the areas A each provided with a significantly smaller number of perforations than the corresponding areas of the tray shown in FIG. 2. The precise relative distribution of the perforations will depend on the size of the tray. The vapour and liquid flow rates may be calculated for each zone of the tray. The calculation may be based on experimental results or known tray design procedures. The active area, perforation diameter and pitch may then be chosen for each zone using standard hydraulic design methods for distillation trays, paying attention to point efficiency differences that may result from differing flow conditions. The predicted results for the tray may then be compared with results obtained experimentally (typically vapour-liquid dispersion heights) and in the event of the experimental results deviating from those desired, the design procedure may be repeated until a good match with experimental results is obtained.

I claim:

1. A distillation sieve tray in which, in use, there are lower liquid flow rates across some areas and higher liquid flows across other areas, comprising vapour passages formed therethrough, said vapour passages consisting essentially of uncovered perforations having a vertical axis, whereby, in use, the passage of the vapour through said perforations does not impact any horizontal component of velocity to the vapour, an inlet having two side edges and a longitudinal edge for liquid and an outlet having two side edges and a longitudinal edge spaced from said inlet, said inlet longitudinal edge being longer than said outlet longitudinal edge and having wings extending towards the outlet, in which the area immediately between the inlet and outlet is bounded by said inlet and outlet and by two straight lines each one of which extends from one said inlet side edge to the closest one of said outlet side edges and has a first density of vapour passages and the remaining immediately adjacent side or periphery areas of the tray have a second density of vapor passages and wherein said perforations are distributed over essentially the whole liquid-bearing surface of said areas and wherein within each one of the areas, the perforations are uniformly distributed and said first density is greater than said second density, so that, in use, the flow of vapour therethrough more closely matches the flow of liquid from the inlet towards the outlet.

2. A distillation tray as claimed in claim 1, being part-circular in shape and in which the vapour passages are in the form of perforations through the tray surface, and the distribution of the perforations is such that in use the ratio of the flow of liquid to flow of vapour associated with areas having a smaller percentage perforate surface area matches more closely the ratio of the flow of liquid to flow of vapour associated with areas having a larger percentage perforate surface area.

3. A distillation tray as claimed in claim 2, said tray being of the chordal weir or outlet type with the inlet and outlet diametrically opposed.

4. A distillation tray as claimed in claim 3, in which the distribution of perforations is such that Fb is significantly greater than Fa and Vb is significantly greater than Va, but Fa/Va equals Fb/Vb, where Fa is the average flow rate of liquid across said remaining area, Fb is the average flow rate of liquid across the area directly between said inlet and said outlet, Va is the average flow rate and vapour through the passages in said remaining area, and Vb is the average flow rate of vapour through the area directly between said inlet and said outlet.

* * * * *